(No Model.)

A. B. BARKMAN.
LUGGAGE CARRIER FOR BICYCLES.

No. 442,938. Patented Dec. 16, 1890.

Witnesses:
Harry S. Rohrer
G. M. Copenhaver

Inventor:
Albert B. Barkman
by
Attorneys.

UNITED STATES PATENT OFFICE.

ALBERT B. BARKMAN, OF BROOKLYN, NEW YORK.

LUGGAGE-CARRIER FOR BICYCLES.

SPECIFICATION forming part of Letters Patent No. 442,938, dated December 16, 1890.

Application filed June 6, 1890. Serial No. 354,509. (No model.)

*To all whom it may concern:*

Be it known that I, ALBERT B. BARKMAN, a resident of Brooklyn, in the county of Kings and State of New York, have invented certain new and useful Improvements in Luggage-Carriers for Bicycles; and I do hereby declare the following to be a full, clear, and exact description of the invention, such as will enable others skilled in the art to which it pertains to make and use the same.

My invention relates to luggage-carriers especially adapted for use with Safety bicycles of common form, the object being to provide a light, convenient, detachable carrier that shall transmit the weight of the luggage directly to the backbone of the machine instead of to the mud-guard, and that shall nevertheless hold it in nearly the usual position.

Figure 1:
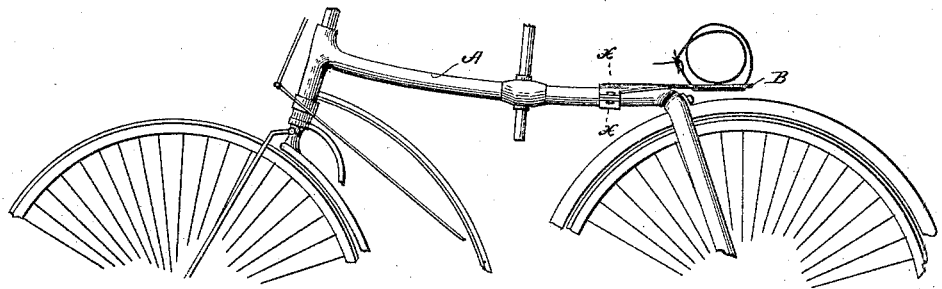
Figure 2:
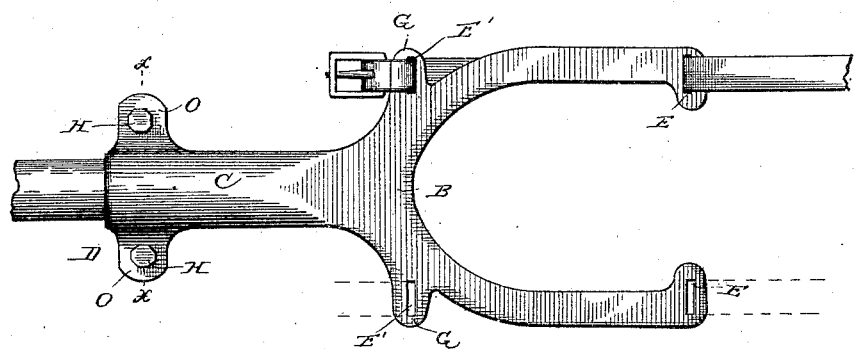
Figure 3:
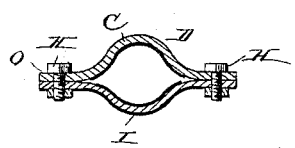

In the drawings, Figure 1 is a partial side view of a bicycle provided with my devices. Fig. 2 shows the carrier and the part to which it is attached, seen from above. Fig. 3 is a section on the line $x$ $x$, Figs. 1 and 2.

In the figures, A is the backbone of the machine, and B a rigid plane-fork upon which luggage is laid directly.

C is a shank formed integrally with the fork, and D a clip for securing the whole in place. Each branch of the fork has at its end an eye E for the passage of a strap F, and similar eyes E' E' in lugs G, projecting from the outer side of the branch near its origin. The four eyes E E' are equidistant from the axis of the carrier, so that the strap passing through one and beneath the fork to the other upon the same branch may be parallel to the other strap when inserted in like manner in the other pair of eyes. The middle line of the shank is in the plane of the fork, but its lateral edges are bent more and more downward in passing forward, so that the shank at its free end is a segment of a cylinder slightly larger than the backbone. At this end the shank is widened to form wings O, and these are bent outward into a horizontal plane and perforated for the passage of bolts H, which also pass through the corresponding ends of a half-clip I, whose middle is curved downward to the same radius as the forward end of the shank. The two parts of the clip are each less than a half-cylinder, and hence when firmly drawn together by the bolts they may firmly clasp the backbone. The inner faces of the clip are covered with leather or the like cemented in place. The form of the fork and the relative positions of the eyes adapt it for securing packages of any size. The shank is of such length that the luggage, although supported from the backbone, is well back over the rear wheel. The curved form of the shank gives it great resistance to flexure, and the leather lining of the clip gives firmness of grasp without danger of marring the backbone. Although for most machines the fork and shank are in the same general plane, the shank may be bent when the location or direction of the parts makes it desirable.

What I claim is—

1. A luggage-carrier for bicycles, having a shank to reach forward from a position over the rear wheel to the backbone, and means for fixing the end of the shank to the backbone.

2. The forked luggage-carrier having the eyes for the insertion of luggage-retaining straps, the partial cylindrical shank, and means for fixing the free end of said shank to the backbone of a bicycle.

3. The combination, with the fork having the eyes in the ends of its branches, of the lugs G, having eyes E', the partial cylindrical shank formed integrally with the fork, and the leather-lined clip for securing the front end of the shank to the backbone of a bicycle.

In testimony whereof I have signed this specification in the presence of two subscribing witnesses.

ALBERT B. BARKMAN.

Witnesses:
ISAAC B. POTTER,
B. K. ADAMS.